(12) United States Patent
Mate

(10) Patent No.: US 10,291,998 B2
(45) Date of Patent: May 14, 2019

(54) DISCOVERY, ANNOUNCEMENT AND ASSIGNMENT OF POSITION TRACKS

(71) Applicant: Nokia Technologies Oy, Espoo (FI)

(72) Inventor: Sujeet Shyamsundar Mate, Tampere (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 15/399,914

(22) Filed: Jan. 6, 2017

(65) Prior Publication Data

US 2018/0196123 A1 Jul. 12, 2018

(51) Int. Cl.
| | |
|---|---|
| *G06F 3/00* | (2006.01) |
| *H04S 3/00* | (2006.01) |
| *G01S 5/18* | (2006.01) |
| *H04S 7/00* | (2006.01) |
| *G01S 5/00* | (2006.01) |
| *G01S 5/06* | (2006.01) |
| *G01S 13/87* | (2006.01) |

(52) U.S. Cl.
CPC .............. *H04S 3/00* (2013.01); *G01S 5/0036* (2013.01); *G01S 5/06* (2013.01); *G01S 5/18* (2013.01); *H04S 7/303* (2013.01); *G01S 13/878* (2013.01); *H04S 2400/15* (2013.01)

(58) Field of Classification Search
CPC .......... H04S 7/301; H04S 7/302; H04S 7/303; H04S 3/00; H04S 2400/15; H04R 2227/005; H04R 2420/03; H04N 21/44227; H04N 21/44218
See application file for complete search history.

(56) References Cited

U.S. PATENT DOCUMENTS

| | | | |
|---|---|---|---|
| 7,277,692 B1* | 10/2007 | Jones | ........................ H04S 3/00 340/574 |
| 9,232,335 B2 | 1/2016 | Carlsson et al. | |
| 9,277,321 B2 | 3/2016 | Toivanen et al. | |
| 9,288,597 B2 | 3/2016 | Carlsson et al. | |

(Continued)

FOREIGN PATENT DOCUMENTS

WO 2015/188220 A1 12/2015

OTHER PUBLICATIONS

Cook, Emory, "Evaluating the Influence of Room Acoustics on L/R Stereo Perception", AES Convention, Nov. 1, 1978, http://www.aes.org/e-lib/browse.cfm?elib=2969, 2 pgs.

*Primary Examiner* — Andrew C Flanders
(74) *Attorney, Agent, or Firm* — Harrington & Smith

(57) ABSTRACT

Embodiments herein relate to methods, apparatuses, and computer program products for discovery, announcement and assignment of position tracks. An example method includes: determining discovery information for discovery of position tracking channels for at least a first positioning system; transmitting the discovery information to the first positioning system; receiving a message from the first positioning system comprising information identifying a set of position tracking channels based on the discovery information, wherein each position tracking channel in the set is associated with a respective object tracked by the first positioning system; and associating at least a first position tracking channel of the set to at least one of: an audio stream, and a second position tracking channel from a second positioning system.

19 Claims, 9 Drawing Sheets

(56) References Cited

U.S. PATENT DOCUMENTS

| | | | |
|---|---|---|---|
| 2006/0125968 A1* | 6/2006 | Yokozawa | G06F 3/033 348/734 |
| 2010/0119072 A1* | 5/2010 | Ojanpera | G10L 19/008 381/17 |
| 2010/0329489 A1* | 12/2010 | Karaoguz | H04S 7/302 381/307 |
| 2012/0155703 A1* | 6/2012 | Hernandez-Abrego | H04R 3/005 382/103 |
| 2012/0295637 A1* | 11/2012 | Hannuksela | G01S 3/8034 455/456.1 |
| 2013/0203446 A1* | 8/2013 | Sylvain | H04W 4/02 455/456.3 |
| 2014/0302773 A1 | 10/2014 | Jantunen et al. | |
| 2014/0362995 A1 | 12/2014 | Backman et al. | |
| 2015/0138370 A1* | 5/2015 | Vilermo | H04S 7/302 348/180 |
| 2015/0215722 A1 | 7/2015 | Milne et al. | |
| 2015/0254045 A1 | 9/2015 | Drake et al. | |
| 2015/0358894 A1 | 12/2015 | Berggren et al. | |

* cited by examiner

DISCOVERY, ANNOUNCEMENT AND ASSIGNMENT OF POSITION TRACKS

TECHNICAL FIELD

This invention relates generally to audio applications and networking and, more specifically, relates to discovery, announcement and assignment of position tracks.

BACKGROUND

This section is intended to provide a background or context to the invention disclosed below. The description herein may include concepts that could be pursued, but are not necessarily ones that have been previously conceived, implemented or described. Therefore, unless otherwise explicitly indicated herein, what is described in this section is not prior art to the description in this application and is not admitted to be prior art by inclusion in this section.

Session announcement protocol (SAP) is a protocol designed to communicate setup information for multicast sessions to prospective participants. For example, SAP is relevant for announcing device capability in audio over IP network (AoIP). AoIP is becoming more popular for audio professionals to use audio transport over IP (AoIP) to transport professional grade audio (e.g. 24-bit 44 KHz, 48 KHz, 96 KHz, etc.).

SUMMARY

The following summary is merely intended to be exemplary. The summary is not intended to limit the scope of the claims.

In accordance with one aspect, an apparatus includes: at least one processor; and at least one memory including computer program code, the at least one memory and the computer program code configured, with the at least one processor, to cause the apparatus to perform at least the following determine discovery information for discovery of position tracking channels for at least a first positioning system; transmit the discovery information to the first positioning system; receive a message from the first positioning system comprising information identifying a set of position tracking channels based on the discovery information, wherein each position tracking channel in the set is associated with a respective object tracked by the first positioning system; and associate at least a first position tracking channel of the set to at least one of: an audio stream, and a second position tracking channel from a second positioning system.

In accordance with another aspect, a method includes determining discovery information for discovery of position tracking channels for at least a first positioning system; transmitting the discovery information to the first positioning system; receiving a message from the first positioning system comprising information identifying a set of position tracking channels based on the discovery information, wherein each position tracking channel in the set is associated with a respective object tracked by the first positioning system; and associating at least a first position tracking channel of the set to at least one of: an audio stream, and a second position tracking channel from a second positioning system In accordance with another aspect, a computer program product includes a non-transitory computer-readable storage medium having computer program code embodied thereon which when executed by an apparatus causes the apparatus to perform at least: determining discovery information for discovery of position tracking channels for at least a first positioning system; transmitting the discovery information to the first positioning system; receiving a message from the first positioning system comprising information identifying a set of position tracking channels based on the discovery information, wherein each position tracking channel in the set is associated with a respective object tracked by the first positioning system; and associating at least a first position tracking channel of the set to at least one of: an audio stream, and a second position tracking channel from a second positioning system In accordance with one aspect, an apparatus includes: at least one processor; and at least one memory including computer program code, the at least one memory and the computer program code configured, with the at least one processor, to cause the apparatus to perform at least the following receive, by a positioning system, discovery information for discovery of position tracking channels; discover, by the positioning system, at least one position tracking channel based on the discovery information, wherein the positioning tracking channel is associated with at least one audio source; and transmit a message from the positioning system comprising information identifying the at least one position tracking channel.

In accordance with another aspect, a method includes receiving, by a positioning system, discovery information for discovery of position tracking channels; discovering, by the positioning system, at least one position tracking channel based on the discovering information, wherein the positioning tracking channel is associated with at least one audio source; and transmitting a message from the positioning system comprising information identifying the at least one position tracking channel.

In accordance with another aspect, a computer program product includes a non-transitory computer-readable storage medium having computer program code embodied thereon which when executed by an apparatus causes the apparatus to perform at least: receiving, by a positioning system, discovery information for discovery of position tracking channels; discovering, by the positioning system, at least one position tracking channel based on the discovering information, wherein the positioning tracking channel is associated with at least one audio source; and transmitting a message from the positioning system comprising information identifying the at least one position tracking channel.

BRIEF DESCRIPTION OF THE DRAWINGS

The foregoing aspects and other features are explained in the following description, taken in connection with the accompanying drawings, wherein.

DETAILED DESCRIPTION

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

The exemplary embodiments herein describe techniques for discovery, announcement and assignment of position tracks. Additional description of these techniques is presented after a system into which the exemplary embodiments may be used is described.

Figure 1:
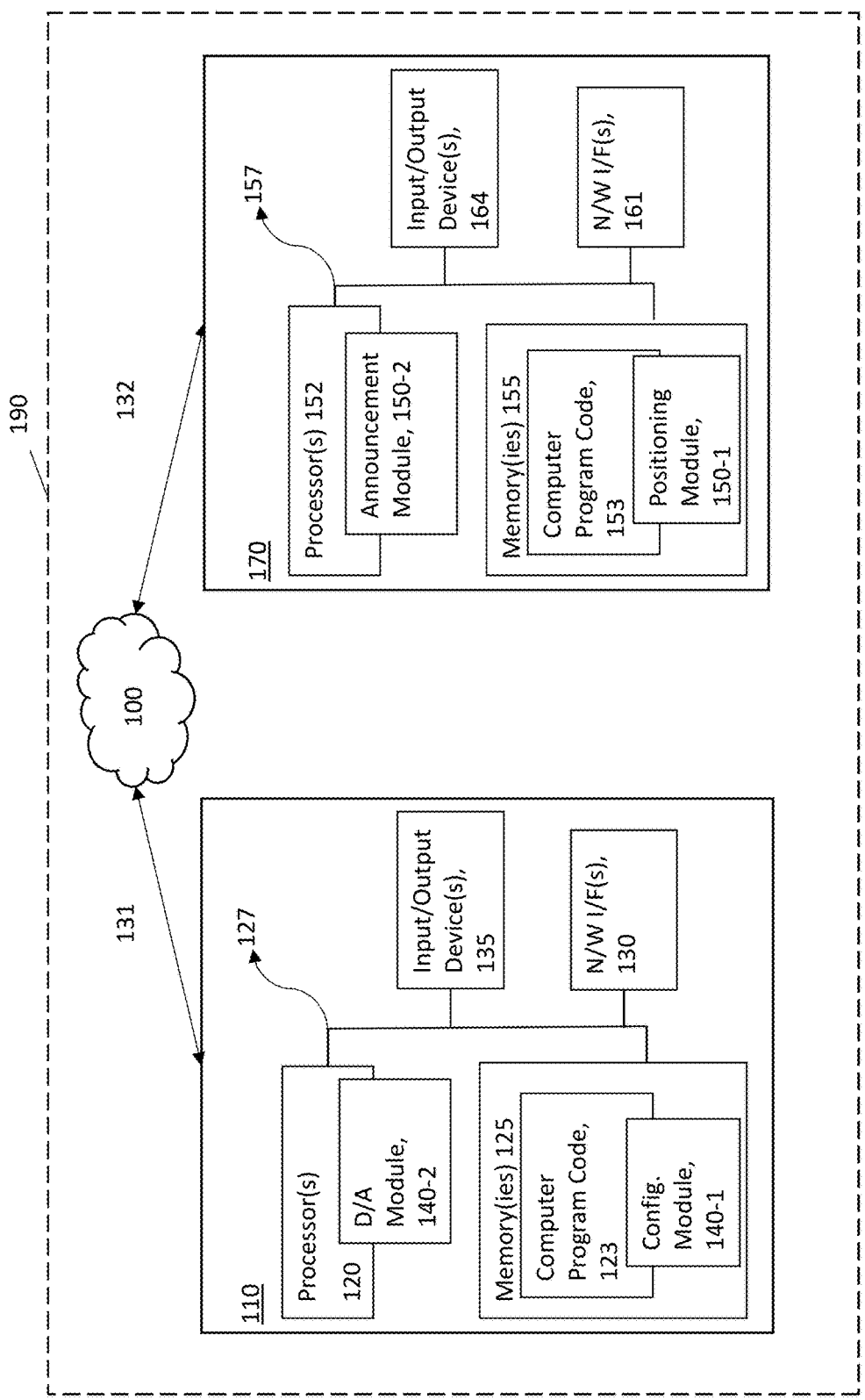
FIG. 1 is a block diagram of one possible and non-limiting exemplary apparatus in which the exemplary embodiments may be practiced.

Turning to FIG. 1, this figure shows a block diagram of one possible and non-limiting exemplary system in which the exemplary embodiments may be practiced. In FIG. 1, a device 110 and device 170 are in communication with a network 100. For simplicity, FIG. 1 includes only two devices 110, 170, however it should be understood that one or more of devices 110 and 170 may also be in communication with the network 100. Although not shown, the network may also comprise further devices, such as access points, switches, and servers, for example.

The device 110 includes one or more processors 120, one or more memories 125, and one or more network interfaces (N/W I/F(s)) 130, interconnected through one or more buses 127. The one or more buses 127 may be address, data, or control buses, and may include any interconnection mechanism, such as a series of lines on a motherboard or integrated circuit, fiber optics or other optical communication equipment, and the like. The one or more memories 125 include computer program code 123. The device may communicate with other devices on the network 100 via link 131 using N/W I/F(s)) 130. The link 131 may be wired or wireless or both, and utilize, for example, any suitable wireless and/or wired protocols, such as but not limited to, cellular, Bluetooth, WiFi, Ethernet, Digital Audio Network Through Ethernet (DANTE), for example. In some embodiments, the apparatus 110 may include one or more input and/or output devices 135. The input and/or output devices 135 may be any commonly known device for inputting or outputting information to or from a computer system, e.g. a mouse, a keyboard, a touch pad, a camera, a touch screen, a transducer, microphone/microphone arrays, display, projector, GPS, gyroscope, accelerometer, receiver, transmitter, receiver, antenna, and/or speaker.

The device 110 includes a Discovery and Announcement module (D/A module), comprising one of or both parts 140-1 and/or 140-2, which may be implemented in a number of ways. The D/A module may be implemented in hardware as D/A module 140-1, such as being implemented as part of the one or more processors 120. The D/A module 140-1 may be implemented also as an integrated circuit or through other hardware such as a programmable gate array. In another example, the D/A module may be implemented as D/A module 140-2, which is implemented as computer program code 123 and is executed by the one or more processors 120. For instance, the one or more memories 125 and the computer program code 123 may be configured to, with the one or more processors 120, cause the user equipment 110 to perform one or more of the operations as described herein.

FIG. 1 also includes a device 170 in communication with the network 100. The device 170 may include one or more processors 152, one or more memories 155, one or more network interfaces (N/W I/F(s)) 161, and one or more input/output devices 164 interconnected through one or more buses 157. The one or more memories 155 include computer program code 153. The device 170 includes an announcement module, comprising one of or both parts 150-1 and/or 150-2, which may be implemented in a number of ways. The announcement module may be implemented in hardware as announcement module 150-1, such as being implemented as part of the one or more processors 152. The announcement module 150-1 may be implemented also as an integrated circuit or through other hardware such as a programmable gate array. In another example, the announcement module may be implemented as announcement module 150-2, which is implemented as computer program code 153 and is executed by the one or more processors 152. For instance, the one or more memories 155 and the computer program code 153 are configured to, with the one or more processors 152, cause the device 170 to perform one or more of the operations as described herein.

The one or more buses 157 may be address, data, or control buses, and may include any interconnection mechanism, such as a series of lines on a motherboard or integrated circuit, fiber optics or other optical communication equipment, and the like. The one or more memories 155 include computer program code 153. The device 170 may communicate with other devices on the network 100 via link 132 using N/W I/F(s)) 161. The link 132 may be wired or wireless or both, and utilize, for example, any suitable wireless and/or wired protocols, such as but not limited to, cellular, Bluetooth, WiFi, Ethernet, Digital Audio Network Through Ethernet (DANTE), for example. In some embodiments, the device 170 may include one or more input and/or output devices 164. The input and/or output devices 164 may be any commonly known device for inputting or outputting information to or from a computer system, e.g. a mouse, a keyboard, a touch pad, a camera, a touch screen, a transducer, microphone/microphone arrays, display, projector, GPS, gyroscope, accelerometer, receiver, transmitter, receiver, antenna, and/or speaker.

The computer readable memories 125 and 155 may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories 125 and 155 may be means for performing storage functions. The processors 120 and 152 may be of any type suitable to the local technical environment, and may include one or more of general purpose computers, special purpose computers, microprocessors, digital signal processors (DSPs) and processors based on a multi-core processor architecture, as non-limiting examples. The processors 120 and 152 may be means for performing functions, such as controlling the device 110, device 170, and other functions as described herein.

In general, the various embodiments of the device 110 and 170 can include, but are not limited to cellular telephones such as smart phones, tablets, personal digital assistants (PDAs), computers such as desktop and portable computers, gaming devices, music storage and playback appliances, tablets as well as portable units or terminals that incorporate combinations of such functions.

In another example, a device 190 may include both D/A module 140-1 and/or 140-2 and the announcement module 150-1 and/or 150-2. In such an example device 190, at least some of the various components of device 110 and 170 may be the same (e.g. processors 120 and 152, memories 125 and 155, etc.) even though these are shown as separate components in the example of FIG. 1. Further, in the case of device 190 the network 100 may be, for example, a local socket that is used to exchange data between D/A module 140-1 and/or 140-2 and the announcement module 150-1 and/or 150-2.

Having thus introduced one suitable but non-limiting technical context for the practice of the exemplary embodiments of this invention, the exemplary embodiments will now be described with greater specificity.

As used herein, high accuracy indoor positioning (HAIP) refers to a BT-LE (BLUETOOTH Low Energy) based high accuracy indoor positioning. A HAIP system includes, for example, BT-LE radio frequency (RF) tags which transmit a RF signal at a specific frequency. A locator is an antenna array which receives the tag signal and determines direction of arrival for each of the corresponding tags. A HAIP system typically uses ceiling based locators for example. A related positioning system is referred to herein as '360 HAIP'. 360 HAIP can provide direction of arrival or position information in all directions. Although embodiments are described herein with reference to HAIP and 360 HAIP, this is not intended to be limiting, and is generally applicable to any positioning system which can provide position tracking information with different formats and frequency, such as indoor positioning systems based on WIFI for example.

Spatial audio application (SAA) as used herein refers to audio applications which may utilize position tracking for sound sources of interest. These sound sources of interest are also referred to herein as objects. As a non-limiting examples audio sources or objects may include instruments, people, speakers, etc.

Embodiments described herein relate to the audio over IP signaling and transport mechanism for enabling position data session negotiation to enable the use of automatically generated panning data, which is relevant to, for example, distributed audio capture or playback application in general, or spatial audio mixing (SAM) type of application in particular. One feature for distributed audio capture and spatial audio mixing includes tracking the position of sound sources of interest. The positions of sound sources of interest may be tracked, for example, using a HAIP system.

The following technologies and standards generally relate to AoIP:

DANTE (Digital Audio Network Through Ethernet), developed by AUDINATE, is a combination of software, hardware, and network protocols that deliver uncompressed, multi-channel, low-latency digital audio over a standard Ethernet network using Layer 3 IP packet;

AES 67 is a standard for audio-over-IP interoperability. The standard was developed by the Audio Engineering Society and published in September 2013. It is a layer 3 protocol suite based on existing standards and is designed to allow interoperability between various IP-based audio networking systems such as RAVENNA, LIVEWIRE, Q-LAN and DANTE. It also identifies commonalties with Audio Video Bridging (AVB) and documents AVB interoperability scenarios.

Typically, devices which are part of the audio over IP network collaborate by first discovering each other and subsequently announcing their respective capabilities. There is a need to expand the position tracking channels discovery and announcement mechanism for spatial audio application. Furthermore, such enhanced capability announcement supports seamless interfacing between the different components that are of special relevance for distributed audio capture, but also generally for multimodal all aspect content capture for Augmented Reality/Virtual Reality.

Typically, device capability discovery and announcement for audio over IP networks is performed as follows.

The device information is announced using Session Announcement Protocol (SAP) or BONJOUR. BONJOUR is APPLE's implementation of zero-configuration networking and relate to a group of technologies that includes service discovery, address assignment, and hostname resolution.

Device information includes name/address resolution and also device capabilities. The device capabilities includes, for example, the number of audio input channels (for receiver devices) or audio output channels (for transmitter devices). For example, microphone pre-amps, such as Rednet 4, are visible as a transmitter with the microphone channels visible as transmit channels. In contrast, a Digital/Analog converter (e.g. Rednet 2) is exposed as a receiver device with each output channel represented as a receive channel.

The session negotiation between each device for each channel is performed as a point to point session set-up, using SIP/SDP and media transmission over RTP (for AES67 compliant session set-up and media transport).

Distributed audio capture poses a challenge for discovering the position track channels used by a spatial audio mixing application. The current mechanism depends on obtaining the position track identifiers (e.g., HAIP tag IDs) by first starting the HAIP tag data transmission and subsequently parsing the data coming from a hard-coded port number. This approach includes one or more of the following drawbacks:

HAIP tags need to start transmitting data before they are parsed from the positioning server transmission stream;

There is no control on which tags are visible to which spatial audio applications;

Automatic binding of position track channels with audio streams or any other tracking method is not supported. For example, manual configuration is required to bind the visual analysis based position tracks and HAIP based position tracks; and In the absence of exposing the position tracking tags as separate channels, it is not possible to route them in off-the-shelf products like DANTE CONTROLLER.

Typically, all the tags that are enabled to transmit position signals are visible to the positioning server as well as spatial audio application. In order to exclude certain tags, the locator configuration file needs to be modified manually. This does not facilitate criteria or application dependent availability of channels.

U.S. application Ser. No. 15/355,404 relates to position stream session negotiation for spatial audio applications, where position stream session negotiations occur between an application and the positioning system in order to provide a position stream which meets the application driven requirements for the position data characteristics. U.S. application Ser. No. 15/355,404 does not specifically describe discovery or announcement of the position track-IDs used as identifiers for session negotiation. Also, off the shelf Audio over IP solutions (e.g. Dante, AES67) do not provide a mechanism for unified session negotiation, consequently a SIP session is required to be negotiated point-to-point for audio and position stream separately.

Figure 2:
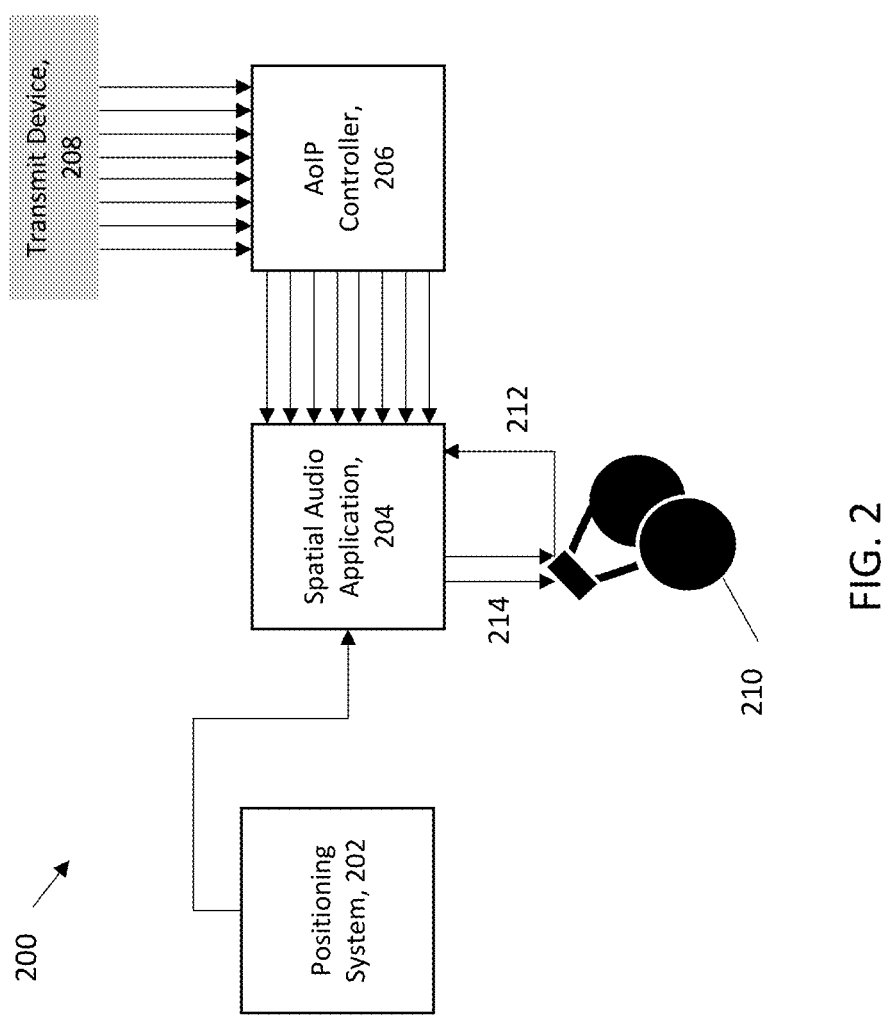
FIG. 2 is a block diagram showing an example system with disjoint audio routing and position data routing.

Referring to FIG. 2, this figure shows an example system 200 with disjoint audio routing and position data routing. The system 200 includes a positioning system 202, a spatial audio application 204, an AoIP controller 206, and a transmit device 208. In the non-limiting example shown in FIG. 2, headphones 210 may be used to monitor the output audio mix. The two arrows 214 represent two output channels for the headphone output, and the single arrow 212 represents head tracking data for binaural rendering. In other examples, the output could be other formats, such as 5.x and 7.x for example. In this figure, the spatial audio application 204 is an application that may, for example, create, monitor, edit, and/or mix spatial audio (e.g. object-based audio), from different audio sources. The transmit device 208 (e.g. close-up mic input from Rednet4) transmits audio data to the AoIP controller 206 (e.g. Dante Controller). The audio data is received at the spatial audio application 204 as input streams from AoIP controller 206. For example, the input streams may be input audio channels including one or more object channels as well as one or more microphone arrays. The audio data received from the transmitter device 208 may be associated with various identifiers or 'tags' so that a user of the spatial audio application 204 can manage the received audio data. The spatial audio application 204 may also receive position updates from the positioning system 202, such as a high accuracy indoor positioning system (HAIPS) for example. The positioning data streamed from the positioning system 202 may be based on various motion sensors such as accelerometers, gyroscope, etc. Typically, the frequency in which the positing data is received is hardcoded, and done in an open-loop fashion. The hardcoded frequency may be set by a user based on a per-tag basis, or may be set to some default value. As can be seen in FIG. 2, the positioning system 202 (e.g. HAIP system) sends an open loop hard-coded position stream to the spatial audio application 204, which is disjoint from the input streams from the AoIP controller 206.

Embodiments described herein relate to a method for discovery and announcement of position tracking channel identifiers in order to enable spatial audio applications or middleware to initiate session negotiation. The position tracking channel identifier is necessary to enable the spatial audio application (which consumes the position tracking data) to indicate the particular position tag for which session negotiation is performed. The position tracking channel announcement can be done using any suitable signaling mechanism, such as via SIP INFO method for SIP initiated position streaming sessions or carried over HTTP transport with JSON or XML formatted announcement data, for example.

According to embodiments, the position track announcements may be updated with information about new position tags or the position track announcement may update the status of the existing tags. This mid-session control data enables continuous un-interrupted position update transmission.

In case of interactive content streaming application scenario, the streaming application receiving this content may have the position tracks signaled via an updated Media Presentation Description (MPD) for audio-visual MPEG-DASH (Dynamic Adaptive Streaming over HTTP) streaming sessions. This is especially useful for live streaming and selection of content.

According to some embodiments, a criteria based discovery and signaling mechanism is provided. The discovery criteria can encompass position information based segments of the event venue or direction of arrival based sectors defined for different observation points (OPs) of distributed audio capture. This enables application driven policy control for announcing a subset of position tracking channels to each position stream receiving device. For example, some distributed capture devices may choose to obtain position tracks only from a subset of tags. This may include the position tags which belong to one or more DOA range intervals, distance or a combination thereof.

According to some embodiments, automatic assignment of announced tags based on their position information obtained via other methods (such as spatial audio processing, visual content analysis, etc.) is performed for facilitating sensor fusion with multimodal tracking scenarios.

In some exemplary embodiments, dual-stream channels are defined which appear as single logical channel to the audio routing entity. The interface between the audio routing entity and the distributed capture application is consequently visible as a single logical entity for session negotiation and setup. This allows combining the audio data and the corresponding position tracking data for session set up. Consequently, for the spatial audio application, the audio and position stream appear as emanating from a single entity.

Figure 3:
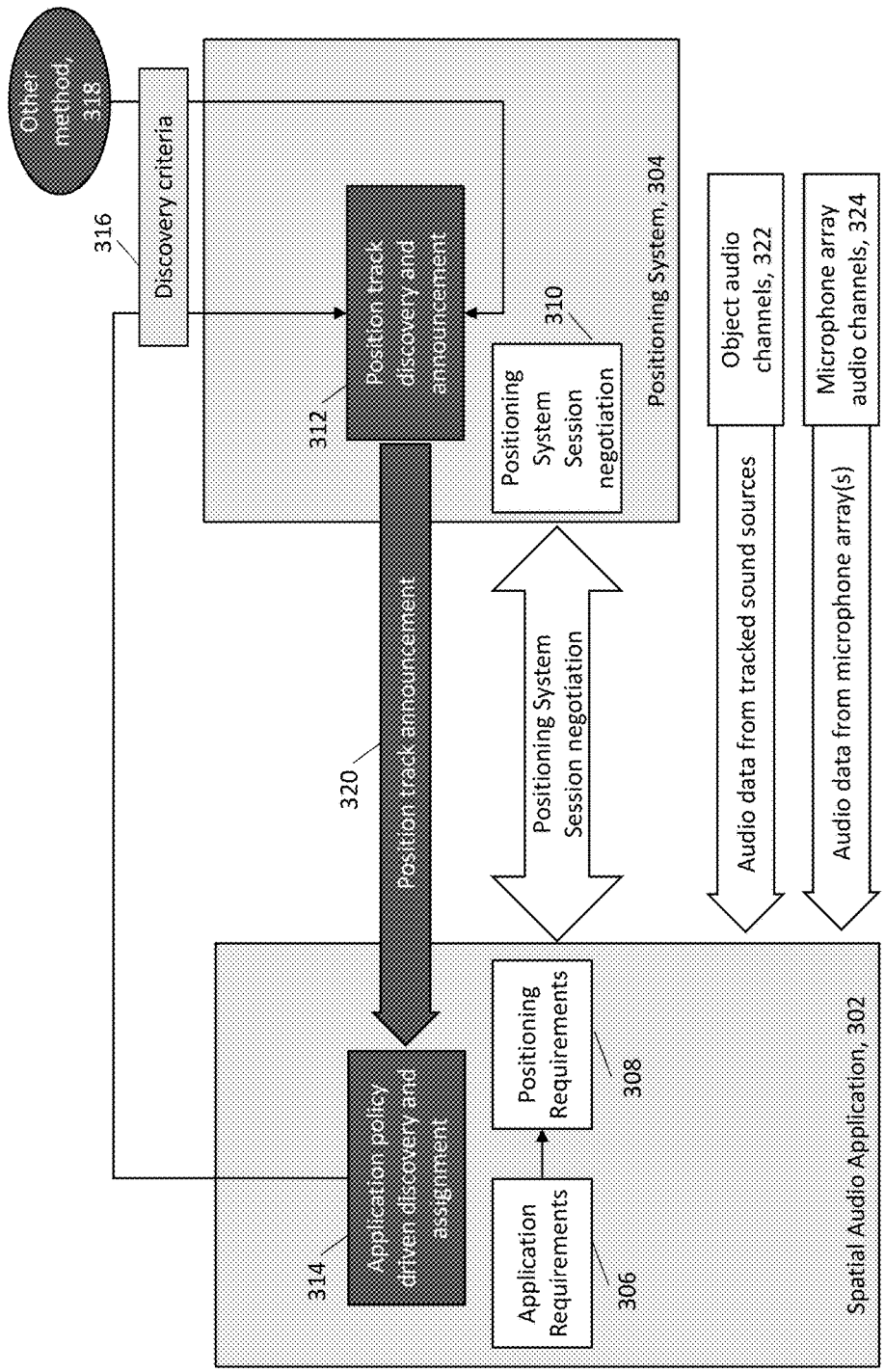
FIG. 3 is a data flow diagram including an example spatial audio capture application and an example positioning system in accordance with exemplary embodiments.

Referring now to FIG. 3, this figure shows an example enhanced spatial audio application 302 and an example enhanced positioning system 304 in accordance with exemplary embodiments. The positioning system 304 includes a position track discovery and announcement module 312, and the spatial audio application 302 includes an application policy driven discovery and assignment module 314. The positioning system 304 may be implemented using a positioning system server where the position track discovery and announcement module 312 is embedded in the positioning system server. The application policy driven discovery and assignment module 314 may be a separate standalone module or embedded with the distributed audio capture application. For the separate standalone module scenario, the standalone module could correspond an independent node in the audio network, such as another computing node sending and receiving position announcement and discovery related data. This data can be sent as a non-high-priority packet, since discovery and announcement are typically less sensitive to latency issues as compared to actual position data.

The module 312 may receive discovery criteria 316 (e.g. discovery information) from the module 314, or discovery criteria 316 may be determined based on other methods 318. For example, the positioning system 304 may derive the discovery criteria 316 itself. The other methods 318 determining the discovery criteria 316 may be methods such as spatial audio processing and visual analysis based object detection. The tags that are subsequently discovered in an overlapping position with the HAIP derived position using these other methods 318 may be automatically assigned to the corresponding sound source. The discovery criteria 316 may be, for example, to discover all tags which are visible to the position system 304. A more selective example is determining tags in one or more 2D/3D regions of interest.

However it should be understood that the position track discovery is not limited by a position tracking method. The discovery criteria 316 may be generated either independently by each spatial audio application or as a group of microphone arrays corresponding to a single free viewpoint production apparatus.

For audio capture, there can be at least two scenarios. The first scenario consists of multiple spatial audio application 302 instances in a given event. In this case, each spatial audio application 302 instance can derive its own discovery criteria policy via the application policy driven discovery and assignment module 314. In a second audio capture scenario, there may be multiple microphone arrays (e.g., corresponding to microphone array audio channels 324) and spatial audio application 302 nodes. The multiple microphone arrays and spatial audio application 302 nodes may be part of the same free viewpoint capture/rendering apparatus. For example, free viewpoint/rendering apparatus may refer to a set of single microphones and microphone arrays to capture both individual sound sources with high clarity and the ambient audio scene. The one or more microphones/microphone-arrays may be, for example, distributed across venue. In this case, the policy needs to be defined for a larger number of capturing microphones and application nodes as a group Subsequent to the discovery, the position track discovery and announcement module 312 causes the positioning system 304 to perform a position track announcement 320. The position track announcement indicates the discovered tracks to the application policy driven discovery and assignment module 314.

The spatial audio application 302 may receive audio data from object audio channels 322 and/or microphone array audio channels 324. For example, the audio object channels 322 and the microphone array audio channels 324 may consist of live data. The object channels 322 could also include pre-recorded data. The module 314 may assign the discovered channels that were announced in the position track announcement to audio streams (such as the audio data associated with object audio channels 322 and/or microphone array audio channels 324 for example). The module 314 may also assign the position tracking channels identified in the position track announcement with other position tracking channels. When assigning the audio streams, an automatic method or an interactive method of assignment may be used. The assignment of the announced position tracks with other position tracking channels (obtained via different methods) can be done based on a predefined criteria. For example, position track channels obtained in the announcement can also indicate their instantaneous positions, which can be used by the module 314 to connect them with the another position tracking stream. According to some embodiments, the predefined criteria could be matching the labels assigned by the spatial audio application 302 to each channel with a tag label. In some embodiments, the predefined criteria may include manually assigning the tags to the announced channels.

A session can then be negotiated for transmitting position data from positioning system 304 to the spatial audio application 302, where the negotiation is based on the identifiers received in the position track announcement.

The position track announcement 320 may be at least one of the following three types:

A broadcast announcement: In this type of announcement the same information is transmitted to all the recipients in the system. In order to facilitate the use of such information, the announcement includes the discovery criteria which is used by the one or more spatial audio devices or applications. The broadcast announcement may be transported as a broadcast message or as a multicast message in order to save network bandwidth.

A unicast announcement: In this type of announcement, information specific to the originating device or application discovery criteria is delivered only to the destination application or device.

Grouped unicast or multicast announcements: These correspond to a group of applications/devices in a network. This is applicable for example, to a group of spatial audio capture devices which are expected capture audio objects which are only within a certain criteria. The multicast message provides all the members of the list information about the position tracks of their interest as well as those belonging to their neighbors. This use case is specifically important for free view point capture scenario, which is described in further detail below with reference to FIG. 4. Significant overhead would be required if all observation points obtain content from all sound sources, even if they are not needed.

An example announcement format is shown in the following example announcement:

```
1:      <Announcement>
2:          <Type>unicast</Type>
3:          <Address>192.168.123.124</Address>
4:          <Criteria>DOA; Azi=0 - 45, 0 - −45; Ele=−90 - 0, 0 - 90</Criteria>
5:          <Device-ID>
6:              <ID>01</ID>
7:          </Device-ID>
8:          <TrackChannels>
9:              <Channel>
10:                 <ID>78C5E56F434B</ID>
11:                 <Type>HAIP1</Type>
12:             </Channel>
13:             <Channel>
14:                 <ID>78C5E56F4344</ID>
15:                 <Type>HAIP1</Type>
16:             </Channel>
17:             <Channel>
18:                 <ID>78C5E56F4345>
19:                 <Type>HAIP1</Type>
20:             </Channel>
21:             <Channel>
22:                 <ID>000000000001</ID>
23:                 <Type>SpatialAudio1</Type>
24:             </Channel>
25:             <Channel>
26:                 <ID>111111111111</ID>
27:                 <Type>Multimodal1, HAIP + Visual</Type>
28:             </Channel>
29:         </TrackChannels>
30:     </Announcement
```

In the example announcement above, five channels are identified that meet the criteria from line 4. The channels are identified using channel identifiers. The announcement further includes information for each channel relating to the type of tracking method (e.g. HAIP, Visual, etc.). The discovery criteria in line 4 is described in terms of DOA, however in other examples, the discovery criteria in the announcement could refer to, for example: DOAD, Cart2D or Cart 3D. It should be appreciated that the above example announcement may also be adapted to different description formats like JSON or SDP depending on the deployment requirements. A similar format as shown in the example above may be used for both unicast and multicast announcement, where only the destination IP address would be different.

Figure 4:
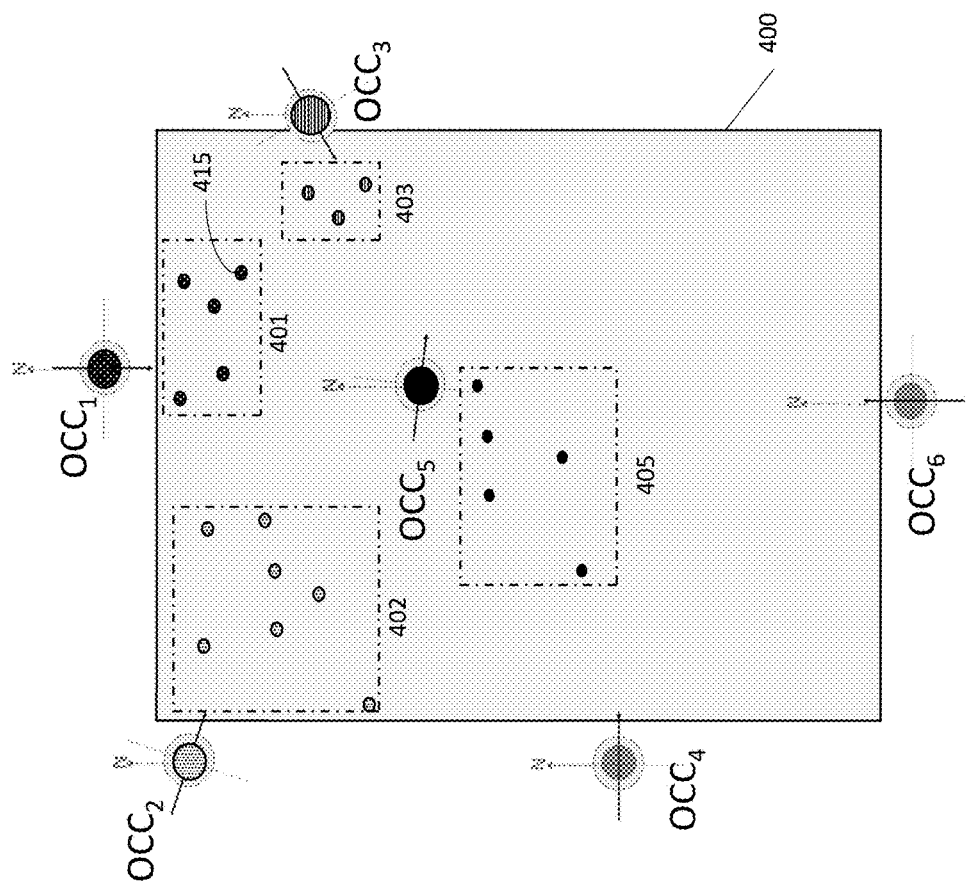
FIG. 4 is a diagram showing criteria based discovery and announcement for a free listening point scenario in accordance with exemplary embodiments.

Referring now to FIG. 4, this figure shows an example diagram showing criteria based discovery and announcement for a free listening point scenario in accordance with exemplary embodiments. In this example, six microphone arrays are shown, namely, $OCC_1$-$OCC_6$. Each OCC device may also be referred to as ab observation points (OPs). These OPs correspond to locations which the different microphone arrays can discover content based on the individual OP specific requirements or group requirements. In FIG. 4, the position tracks (e.g. sound sources) are represented as the smaller circles in box 400. According to one option, the same discovery criteria may be sent to positioning systems collocated with the respective six OCC devices. For example, the discovery criteria may be a specific 2D area as shown by area within box 400 in FIG. 4. Accordingly, the sound sources within boxes 401, 402, 403, and 405 may be discovered by $OCC_1$, $OCC_2$, $OCC_3$, and $OCC_5$, respectively. Another option, is to enable discovery criteria such that all of the OCC devices discover sound sources (position tracks) from all directions, which can be referred to as a free view point capture scenario. Another options is to provide different discovery criteria to each individual OCC device in FIG. 4. For any of the options, the discovery criteria may be sent to the OCC devices individually or as a group, and the different OCC devices based on the individual OP specific requirements or group requirements.

Figure 5A:
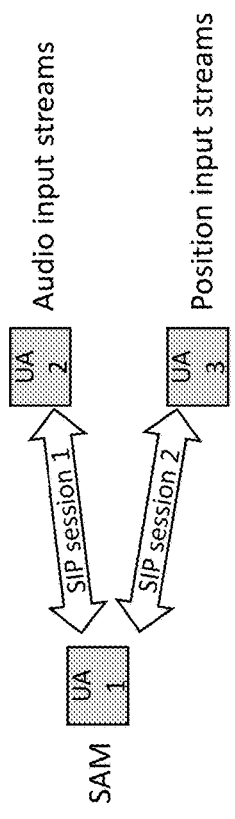
FIG. 5A shows a session set-up using position session negotiation position data routing.

It should be understood that there is a possibility that the same sound source may be discoverable by multiple OCC devices, particularly for the free view point capture scenario. For example, sound source 415 in FIG. 4 may be discovered by both $OCC_1$ and $OCC_3$. As described above, grouped unicast or multicast announcements may be utilized to provide all members a list information about the position tracks of their interest as well as those belonging to their neighbors. Doing so would allow, for example, $OCC_1$ to obtain content from sound source 415 without having $OCC_3$ obtaining the same content from sound source 415. Referring now to FIG. 5A, this figure shows an example architecture for session set-up using position session negotiation position data routing. In this example, User Agent 1 (UA 1) may refer to the spatial audio mixing (SAM) application, UA 2 represents an audio transmitter, and UA 3 represents a positioning system. In this example, UA 1 sets up an SIP session 1 to receive audio data from UA 2. Additionally, UA 1 sets up an SIP session 2 with UA 3 to receive position data from UA 3.

Figure 5B:
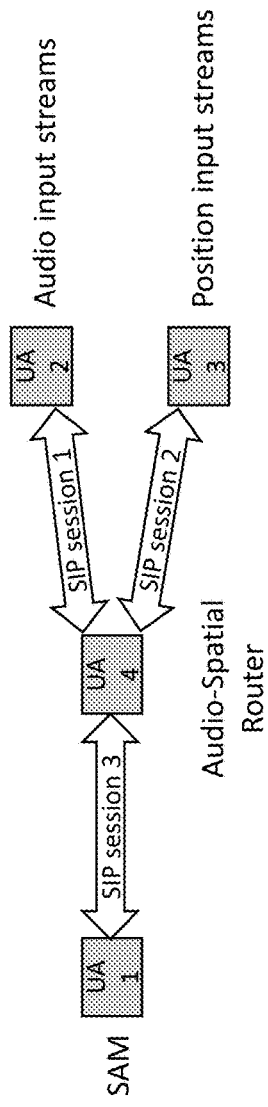
FIG. 5B shows a dual-stream session set-up and media handling in accordance with exemplary embodiments.

In FIG. 5B, this figure shows an enhanced session set-up architecture according to exemplary embodiments. In this example, UA 4 corresponds to an audio-spatial router, such as a VoIP controller for example. UA 2 and UA 3 set up SIP sessions with a UA 4. UA 4 also sets up an SIP session for transmitting both the position data (received via SIP session 2) and the audio data (received via SIP session 1) from UA 2 over the same stream, namely, SIP session 3. This allows UA 1 to receive the data from a single logical entity, namely UA 4. This enhanced architecture allows, for example, a unified signaling set-up from an audio routing bridge, such as Dante Controller for example. Some advantages of this set-up are for example, inter-stream synchronization and buffering for audio and position stream in a single session. This dual-stream capability announcement method enables seamless interfacing of audio transmitter and position transmitter devices with a spatial audio application.

Figure 6:
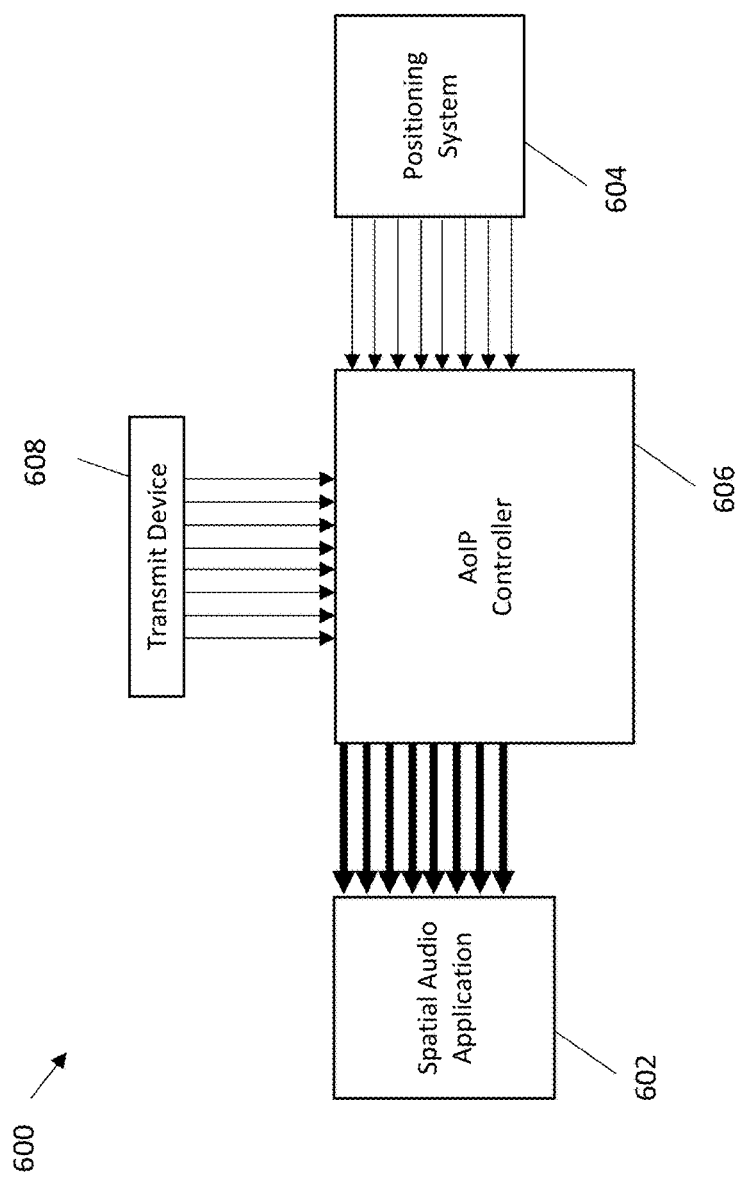
FIG. 6 is a block diagram showing an example system with dual audio-position data streams in accordance with exemplary embodiments.

Referring to FIG. 6, this figure is a block diagram of an example system 600 with dual audio-position data streams. The system 600 is based on the enhanced session set-up architecture as shown in FIG. 5B. The system 600 comprises a spatial audio application 602, a positioning system 604, an AoIP controller 606, and a transmit device 608. It should be understood that the system 600 may include one or more transmit devices 608, positioning systems 604, etc. The AoIP controller 606 receives multiple audio data streams from the transmit device 608, which in FIG. 6 are shown as arrows from transmit device 608 to AoIP controller 606. The AoIP controller 606 also receives multiple position data streams from positioning system 604, which in FIG. 6 are represented as arrows from positioning system 604 to AoIP controller 606. The AoIP controller 606 then transmits multiple data streams to the spatial audio application 602, which in FIG. 6 are shown as bolded arrows from AoIP controller 606 to spatial audio application 602. Each of these streams may include both position data from positioning system 604 and audio data from transmit device 608, for example.

Figure 7:
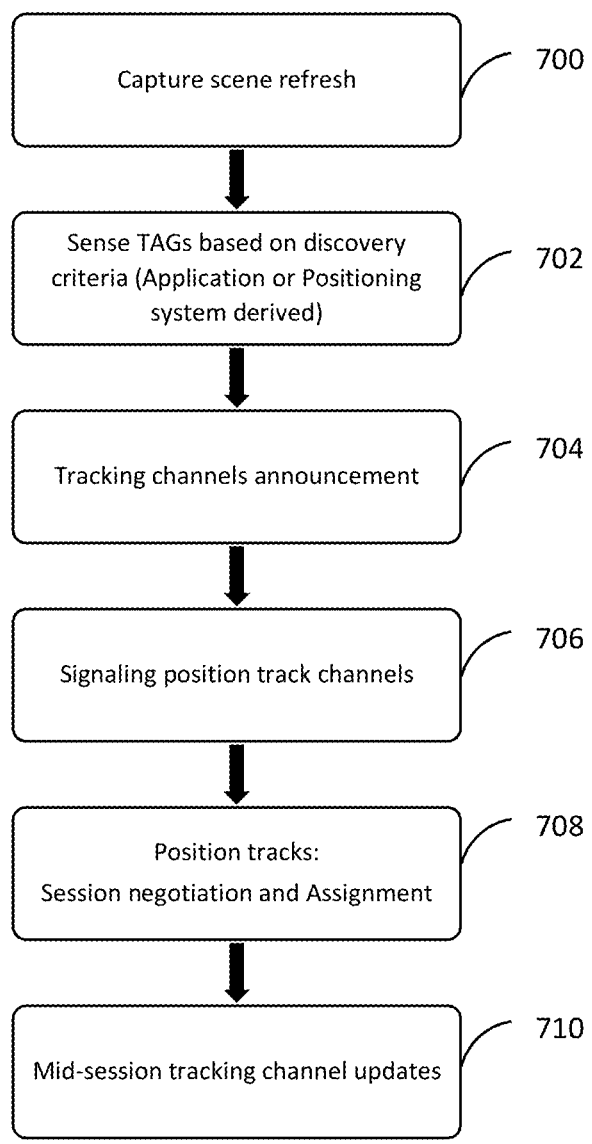
FIG. 7 is a high-level flow chart for discovery, announcement and assignment of position tracks in accordance with exemplary embodiments.

FIG. 7 is a high-level flow chart for discovery, announcement and assignment of position tracks in accordance with exemplary embodiments. At step 700, the capture scene is obtained. At step 702, one or positions tags are sensed by a positioning system based on the discovery criteria provided by the application or any other suitable entity (e.g. another suitable device or module which delivers information to the positioning system). At step 704, the channels are announced based on the discovery criteria. Subsequently, at step 706 the position tracking channels are signaled to the recipient (which can either be a spatial audio application or other position tracking system). At step 708, the position track channels are assigned to audio streams and/or further position track channels, and session negotiation is performed. At step 710, tracking channel updates are provided mid-session, and if necessary, the streams are updated to reflect the updates.

Figure 8:
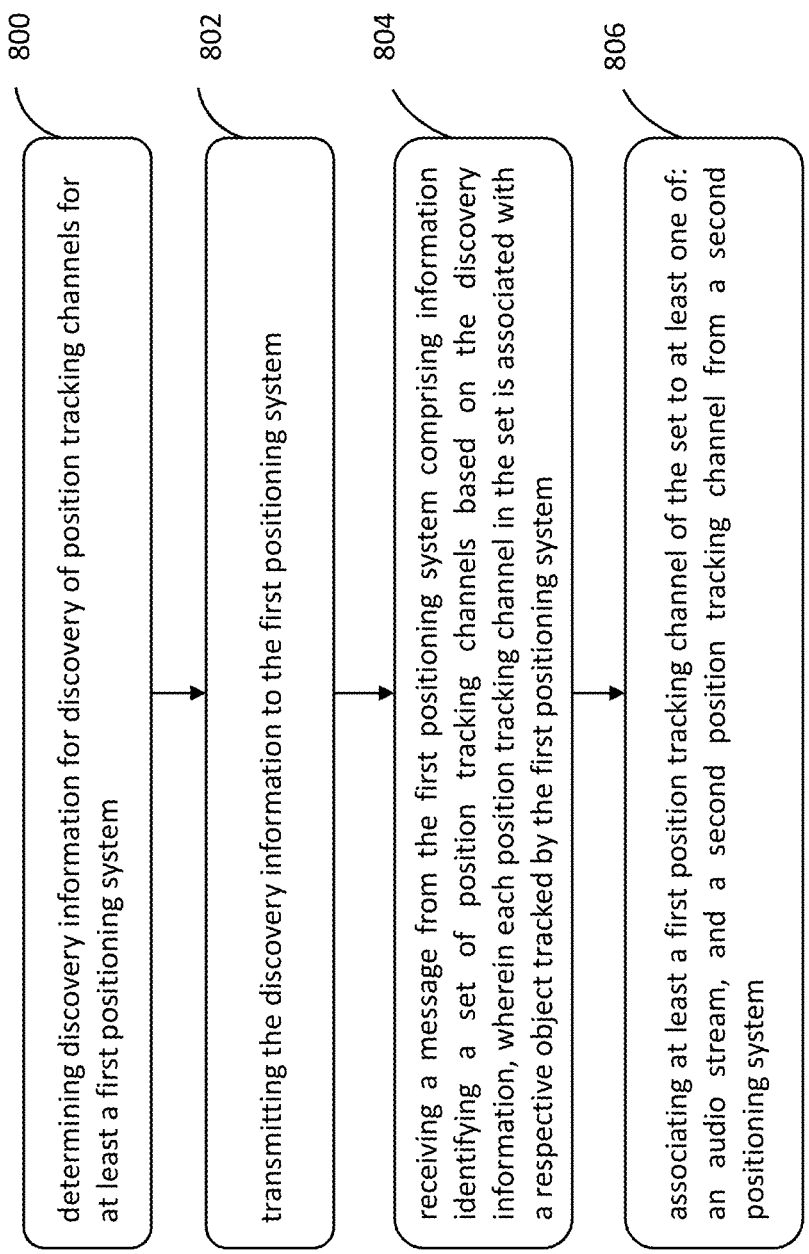
FIGS. 8 and 9 are logic flow diagrams for discovery, announcement and assignment of position tracks, and illustrate the operation of an exemplary method, a result of execution of computer program instructions embodied on a computer readable memory, functions performed by logic implemented in hardware, and/or interconnected means for performing functions in accordance with exemplary embodiments.

FIG. 8 is a logic flow diagram for position stream session negotiation. This figure further illustrates the operation of an exemplary method, a result of execution of computer program instructions embodied on a computer readable memory, functions performed by logic implemented in hardware, and/or interconnected means for performing functions in accordance with exemplary embodiments. For instance, the D/A module 140-1 and/or 140-2 may include multiples ones of the blocks in FIG. 8, where each included block is an interconnected means for performing the function in the block. The blocks in FIG. 8 are assumed to be performed by the device 110 or device 190, e.g., under control of the D/A module 140-1 and/or 140-2 at least in part.

Referring to FIG. 8, an example method is provided, the method including determining discovery information for discovery of position tracking channels for at least a first positioning system as indicated by block 800; transmitting the discovery information to the first positioning system as indicated by block 802; receiving a message from the first positioning system comprising information identifying a set of position tracking channels based on the discovery information, wherein each position tracking channel in the set is associated with a respective object tracked by the first positioning system as indicated by block 804; and associating at least a first position tracking channel of the set to at least one of: an audio stream, and a second position tracking channel from a second positioning system as indicated by block 806.

The message may further comprises position information of the tracked object associated with the first position tracking channel for a given time instant, and the association of the first position tracking channel may comprise: determining that the first position tracking channel and the second position tracking channel are associated with the same tracked object based at least on the position information; and automatically associate the first position tracking channel to the second position tracking channel in response to the determination. The first positioning system and the second positioning system may track the object using different types of tracking methods. The association of the first position tracking channel may include associating the first position tracking channel to at least one of: the audio stream, and the second position tracking channel based on user input. The message may identify each of the position tracking channels based on a unique identifier. The method may further comprise initiating one or more data streams for transmitting data associated with the set of position tracking channels based at least on the respective unique identifiers, wherein the data of one of the initiated data streams may include position data of the tracked object associated with the first position tracking channel and audio data from the audio stream associated to the first position tracking channel. The method may further comprise: receiving a second message from the first positioning system comprising further information of position tracking channels based on the discovery information; and adjusting the one or more of the initiated data streams based on the further information. The further information may include at least one of: information for at least one new position tracking channel based on the discovery information; and updated information for one or more of the position tracking channels in the set. The discovery information may indicate criteria to discover at least one of: position tracking channels based on a distance value; position tracking channels based on an azimuth value; position tracking channels based on an elevation value; and position tracking channels based on a region of interest. The region of interest may be at least one of a two-dimensional region of interest, and a three-dimensional region of interest. The message may include an indication of a type of tracking method used for tracking the tracked object. The discovery information may include an indication to discover at least one of: criteria for discovering all position tracking channels associated with the positioning system, and criteria for discovering at least one specific position tracking channel. The method may further comprise: initiating session negotiation for spatial audio capture based on the association of at least the first position tracking channel of the set to the at least one of: the audio stream, and the second position tracking channel from the second positioning system.

In one example embodiment, an apparatus (e.g. device 110 or device 190 of FIG. 1) may comprise at least one processor; and at least one memory including computer program code, the at least one memory and the computer program code may be configured, with the at least one processor, to cause the apparatus to at least: determine discovery information for discovery of position tracking channels for at least a first positioning system; transmit the discovery information to the first positioning system; receive a message from the first positioning system comprising information identifying a set of position tracking channels based on the discovery information, wherein each position tracking channel in the set is associated with a respective object tracked by the first positioning system; and associate at least a first position tracking channel of the set to at least one of: an audio stream, and a second position tracking channel from a second positioning system The message may further comprises position information of the tracked object associated with the first position tracking channel for a given time instant, and the association of the first position tracking channel may comprise: determining that the first position tracking channel and the second position tracking channel are associated with the same tracked object based at least on the position information; and automatically associate the first position tracking channel to the second position tracking channel in response to the determination. The first positioning system and the second positioning system may track the object using different types of tracking methods. The association of the first position tracking channel may include associating the first position tracking channel to at least one of: the audio stream, and the second position tracking channel based on user input. The message may identify each of the position tracking channels based on a unique identifier. The at least one memory and the computer program code may be configured, with the at least one processor, to cause the apparatus to at least: initiate one or more data streams for transmitting data associated with the set of position tracking channels based at least on the respective unique identifiers, wherein the data of one of the initiated data streams may include position data of the tracked object associated with the first position tracking channel and audio data from the audio stream associated to the first position tracking channel. The at least one memory and the computer program code may be configured, with the at least one processor, to cause the apparatus to at least: receive a second message from the first positioning system comprising further information of position tracking channels based on the discovery information; and adjust the one or more of the initiated data streams based on the further information. The further information may include at least one of: information for at least one new position tracking channel based on the discovery information; and updated information for one or more of the position tracking channels in the set. The discovery information may indicate criteria to discover at least one of: position tracking channels based on a distance value; position tracking channels based on an azimuth value; position tracking channels based on an elevation value; and position tracking channels based on a region of interest. The region of interest may be at least one of a two-dimensional region of interest, and a three-dimensional region of interest. The message may include an indication of a type of tracking method used for tracking the tracked object. The discovery information may include an indication to discover at least one of: criteria for discovering all position tracking channels associated with the positioning system, and criteria for discovering at least one specific position tracking channel. The at least one memory and the computer program code are configured, with the at least one processor, to cause the apparatus to at least: initiate session negotiation for spatial audio capture based on the association of at least the first position tracking channel of the set to the at least one of: the audio stream, and the second position tracking channel from the second positioning system.

In one example embodiment, an apparatus may comprise: means for determining discovery information for discovery of position tracking channels for at least a first positioning system; means for transmitting the discovery information to the first positioning system; means for receiving a message from the first positioning system comprising information identifying a set of position tracking channels based on the discovery information, wherein each position tracking channel in the set is associated with a respective object tracked by the first positioning system; and means for associating at least a first position tracking channel of the set to at least one of: an audio stream, and a second position tracking channel from a second positioning system.

Figure 9:
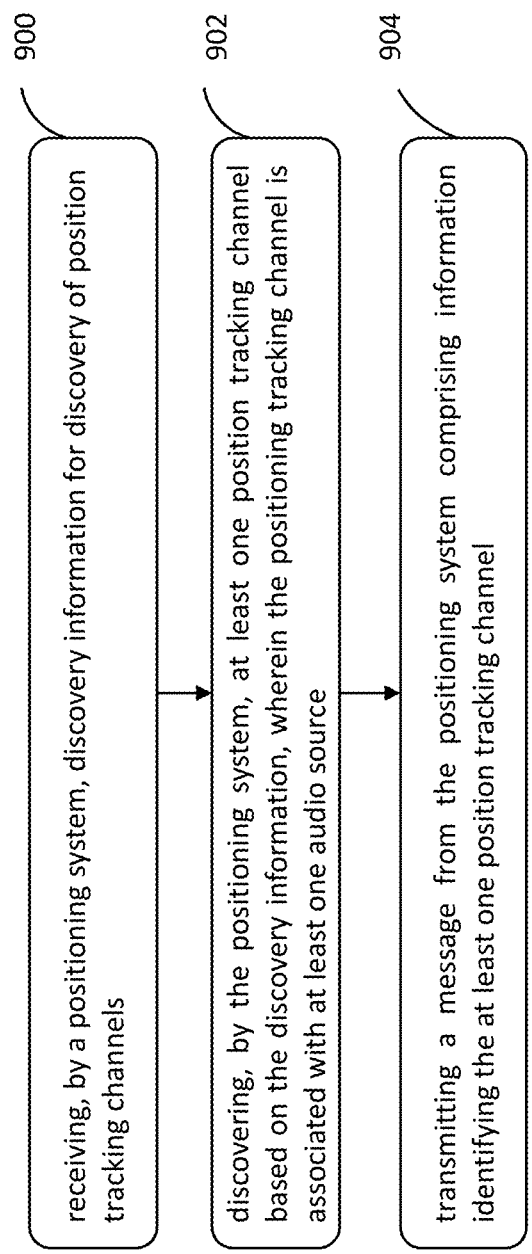

In another embodiment, a computer program product may include a non-transitory computer-readable storage medium having computer program code embodied thereon which when executed by an apparatus causes the apparatus to perform: determining discovery information for discovery of position tracking channels for at least a first positioning system; transmitting the discovery information to the first positioning system; receiving a message from the first positioning system comprising information identifying a set of position tracking channels based on the discovery information, wherein each position tracking channel in the set is associated with a respective object tracked by the first positioning system; and associating at least a first position tracking channel of the set to at least one of: an audio stream, and a second position tracking channel from a second positioning system FIG. 9 is a logic flow diagram for position stream session negotiation. This figure further illustrates the operation of an exemplary method, a result of execution of computer program instructions embodied on a computer readable memory, functions performed by logic implemented in hardware, and/or interconnected means for performing functions in accordance with exemplary embodiments. For instance, the announcement module 150-1 and/or 150-2 may include multiples ones of the blocks in FIG. 8, where each included block is an interconnected means for performing the function in the block. The blocks in FIG. 8 are assumed to be performed by the device 170 or 190, e.g., under control of the announcement module 150-1 and/or 150-2 at least in part.

In another example embodiment, a method may include receiving, by a positioning system, discovery information for discovery of position tracking channels as indicated by block 900; discovering, by the positioning system, at least one position tracking channel based on the discovery information, wherein the positioning tracking channel is associated with at least one audio source as indicated by block 902; and transmitting a message from the positioning system comprising information identifying the at least one position tracking channel as indicated by block 904.

The discovery information may include an indication to discover at least one of: all position tracking channels associated with the positioning system, and at least one specific position tracking channel.

In another example embodiment, an apparatus (e.g. device 170 or device 190 of FIG. 1) may comprise at least one processor; and at least one memory including computer program code, the at least one memory and the computer program code may be configured, with the at least one processor, to cause the apparatus to at least: receive, by a positioning system, discovery information for discovery of position tracking channels; discover, by the positioning system, at least one position tracking channel based on the discovery information, wherein the positioning tracking channel is associated with at least one audio source; and transmit a message from the positioning system comprising information identifying the at least one position tracking channel.

In another example embodiment, an apparatus may include means for receiving, by a positioning system, discovery information for discovery of position tracking channels; means for discovering, by the positioning system, at least one position tracking channel based on the discovery information, wherein the positioning tracking channel is associated with at least one audio source; and means for transmitting a message from the positioning system comprising information identifying the at least one position tracking channel.

In another embodiment, a computer program product may include a non-transitory computer-readable storage medium having computer program code embodied thereon which when executed by an apparatus causes the apparatus to perform receiving, by a positioning system, discovery information for discovery of position tracking channels; discovering, by the positioning system, at least one position tracking channel based on the discovery information, wherein the positioning tracking channel is associated with at least one audio source; and transmitting a message from the positioning system comprising information identifying the at least one position tracking channel.

Without in any way limiting the scope, interpretation, or application of the claims appearing below, a technical effect of one or more of the example embodiments disclosed herein is to provide a flexible framework for applications to use position tracking channels derived from various methods by reducing user effort such as manual tag hardware activation. Another technical effect of one or more of the example embodiments disclosed herein is Application control for dynamic filtering of tags. Important for enabling easy configuration of free listening point audio capture and rendering solution. Another technical effect of one or more of the example embodiments disclosed herein is to enable easy interfacing with sensor fusion methods for multimodal tracking (e.g. combining HAIP and audio based tracking) and making the position tracking information negotiation agnostic to the positioning method. Another technical effect of one or more of the example embodiments disclosed herein is to enable dual-stream capability for easier workflow for audio engineers.

Embodiments herein may be implemented in software (executed by one or more processors), hardware (e.g., an application specific integrated circuit), or a combination of software and hardware. In an example embodiment, the software (e.g., application logic, an instruction set) is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted, e.g., in FIG. 1. A computer-readable medium may comprise a computer-readable storage medium (e.g., memory 125 and 155 or other device) that may be any media or means that can contain, store, and/or transport the instructions for use by or in connection with an instruction execution system, apparatus, or device, such as a computer. A computer-readable storage medium does not comprise propagating signals.

Any combination of one or more computer readable medium(s) may be utilized as the memory. The computer readable medium may be a computer readable signal medium or a non-transitory computer readable storage medium. A non-transitory computer readable storage medium does not include propagating signals and may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

What is claimed is:

1. An apparatus comprising:
   at least one processor; and
   at least one memory including computer program code,
      the at least one memory and the computer program code configured, with the at least one processor, to cause the apparatus to perform at least the following:
      determine, for at least a first positioning system, discovery information for discovery of position tracking channels, wherein the position tracking channels are for transmitting position data between the apparatus and at least the first positioning system;
      transmit the discovery information to the first positioning system;
      receive a message from the first positioning system, the message comprising information identifying a set of the position tracking channels based on the discovery information, wherein each of the position tracking channels in the set is associated with at least one object tracked by the first positioning system, and wherein at least one of the position tracking channels in the set is identified by a unique channel identifier; and
      associate at least a first one of the position tracking channels of the set to at least one of: an audio stream, or a second position tracking channel from a second positioning system.

2. The apparatus of claim 1, wherein the message further comprises position information of the at least one object associated with the first position tracking channel for a given time instant, and wherein the association of the first position tracking channel comprises:
   determining that the first position tracking channel and the second position tracking channel are associated with a same one of the at least one object based at least on the position information; and
   automatically associate the first position tracking channel to the second position tracking channel in response to the determination that the first position tracking channel and the second position tracking channel are associated with the same object.

3. The apparatus of claim 2, wherein the first positioning system and the second positioning system track the same object using different types of tracking methods.

4. The apparatus of claim 1, wherein the association of the first position tracking channel comprises associating the first position tracking channel to at least one of: the audio stream, or the second position tracking channel based on user input.

5. The apparatus of claim 1, wherein the at least one memory and the computer program code are configured, with the at least one processor, to cause the apparatus to at least:
   initiate one or more data streams for transmitting data associated with the set of position tracking channels based at least on the unique channel identifier(s), wherein the data of one of the initiated data streams comprises the position data of the at least one object associated with the first position tracking channel and audio data from the audio stream associated to the first position tracking channel.

6. The apparatus of claim 5, wherein the at least one memory and the computer program code are configured, with the at least one processor, to cause the apparatus to at least:
   allow the apparatus to receive a second message from the first positioning system comprising further information of position tracking channels based on the discovery information; and
   adjust the one or more of the initiated data streams based on the further information.

7. The apparatus of claim 6, wherein the further information comprises at least one of:
   information for at least one new position tracking channel based on the discovery information; or
   updated information for one or more of the position tracking channels in the set.

8. The apparatus of claim 1, wherein the discovery information indicates criteria to discover at least one of:
   the position tracking channels based on a distance value;
   the position tracking channels based on an azimuth value;
   the position tracking channels based on an elevation value; or
   the position tracking channels based on a region of interest.

9. The apparatus of claim 8, wherein the region of interest, when the discovery of the position tracking channels is based on the region of interest, is at least one of a two-dimensional region of interest, or a three-dimensional region of interest.

10. The apparatus of claim 1, wherein the message comprises an indication of a type of tracking method used for tracking the at least one object.

11. The apparatus of claim 1, wherein the discovery information comprises an indication to discover at least one of:
   criteria for discovering all of the position tracking channels associated with the first positioning system, or
   criteria for discovering at least one specific one of the position tracking channels.

12. The apparatus of claim 1, wherein the at least one memory and the computer program code are configured, with the at least one processor, to cause the apparatus to at least:
   initiate session negotiation for spatial audio capture based on the association of at least the first position tracking channel of the set to at least one of: the audio stream, or the second position tracking channel from the second positioning system.

13. A method comprising:
   determining, for at least a first positioning system, discovery information for discovery of position tracking channels, wherein the position tracking channels are for transmitting position data between an apparatus and at least the first positioning system;

transmitting the discovery information to the first positioning system;

receiving a message from the first positioning system, the message comprising information identifying a set of the position tracking channels based on the discovery information, wherein each of the position tracking channels in the set is associated with at least one object tracked by the first positioning system, and wherein at least one of the position tracking channels in the set is identified by a unique channel identifier; and associating at least a first one of the position tracking channels of the set to at least one of: an audio stream, or a second position tracking channel from a second positioning system.

14. The method of claim 13, wherein the message further comprises position information of the at least one object associated with the first position tracking channel for a given time instant, and wherein the association of the first position tracking channel comprises:

determining that the first position tracking channel and the second position tracking channel are associated with a same one of the at least one object based at least on the position information; and automatically associate the first position tracking channel to the second position tracking channel in response to the determination that the first position tracking channel and the second position tracking channel are associated with the same object.

15. The method of claim 13, wherein the associating of the first position tracking channel comprises associating the first position tracking channel to at least one of: the audio stream, or the second position tracking channel based on user input.

16. The method of claim 13, further comprising:

initiating one or more data streams for transmitting data associated with the set of position tracking channels based at least on the unique channel identifier(s), wherein the data of one of the initiated data streams comprises the position data of the at least one object associated with the first position tracking channel and audio data from the audio stream associated to the first position tracking channel.

17. A computer program product comprising a non-transitory computer-readable medium bearing computer program code for performing the method of claim 13 when executed by a computer.

18. An apparatus comprising:

at least one processor; and at least one memory including computer program code, the at least one memory and the computer program code configured, with the at least one processor, to cause the apparatus to perform at least the following:

receive, by a positioning system, discovery information for discovery of position tracking channels, wherein the position tracking channels are for transmitting position data;

discover, by the positioning system, at least one of the position tracking channels based on the discovery information, wherein the at least one positioning tracking channel is associated with at least one audio source; and transmit a message from the positioning system comprising information identifying the at least one position tracking channel, and wherein at least one position tracking channel is identified by a unique channel identifier.

19. The apparatus of claim 18, wherein the discovery information comprises an indication to discover at least one of:

all of the position tracking channels associated with the positioning system, or at least one specific one of the position tracking channels.

* * * * *